US 011125226B2

(12) United States Patent
Hines et al.

(10) Patent No.: US 11,125,226 B2
(45) Date of Patent: Sep. 21, 2021

(54) ADJUSTABLE STOP FOR CHECK VALVE

(71) Applicant: Graco Minnesota Inc., Minneapolis, MN (US)

(72) Inventors: Bradley H. Hines, Andover, MN (US); Jeromy D. Horning, Albertville, MN (US); Mariusz J. Luczak, Elk River, MN (US); William M. Blenkush, Becker, MN (US); Mark D. Shultz, Minneapolis, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 512 days.

(21) Appl. No.: 15/629,025

(22) Filed: Jun. 21, 2017

(65) Prior Publication Data
US 2017/0284550 A1 Oct. 5, 2017

Related U.S. Application Data

(62) Division of application No. 14/370,177, filed as application No. PCT/US2012/069780 on Dec. 14, 2012, now Pat. No. 9,732,869.
(Continued)

(51) Int. Cl.
*F04B 53/10* (2006.01)
*F04B 49/22* (2006.01)
(Continued)

(52) U.S. Cl.
CPC .......... *F04B 53/1085* (2013.01); *F04B 49/22* (2013.01); *F04B 49/225* (2013.01);
(Continued)

(58) Field of Classification Search
CPC ........ F16K 15/04; F16K 15/044; F16K 15/06; F16K 15/03; F16K 15/025; F16K 15/042;
(Continued)

(56) References Cited

U.S. PATENT DOCUMENTS 1,642,724 A * 9/1927 Fleming .................. F16K 15/04
137/533.13
1,989,870 A * 2/1935 Lafferty, Jr. .......... F16K 15/183
251/211
(Continued)

FOREIGN PATENT DOCUMENTS

CA 1107601 A * 8/1981 ............. F16K 15/04
CN 201875216 U 6/2011
(Continued)

OTHER PUBLICATIONS

Patent Cooperation Treaty, International Search Authority, International Search Report and Written Opinion, dated Apr. 10, 2013, 10 pages.
(Continued)

*Primary Examiner* — Nathan C Zollinger
(74) *Attorney, Agent, or Firm* — Kinney & Lange, P.A.

(57) ABSTRACT

A check valve comprises a housing, a fluid passage, a seat, a valve member and a stop. The fluid passage extends through the housing. The seat is disposed in the fluid passage. The valve member is positioned in the passage to engage the seat. The stop extends through the housing to engage the valve member. The stop is accessible from outside the housing to adjust a distance the valve member can travel from the seat. In one embodiment, the stop includes a variable stop feature, such as an offset pin or a cam. In another embodiment, the stop includes a pump control valve. In yet another embodiment, the housing includes markings to indicate a position of the stop. The valve member comprises a ball or a poppet in different embodiments.

19 Claims, 8 Drawing Sheets

Related U.S. Application Data

(60) Provisional application No. 61/570,901, filed on Dec. 15, 2011.

(51) Int. Cl.
*F04B 7/02* (2006.01)
*F04C 15/06* (2006.01)
*F16K 15/03* (2006.01)
*F16K 15/04* (2006.01)
*F16K 15/02* (2006.01)
*F16K 17/06* (2006.01)

(52) U.S. Cl.
CPC .............. *F04B 53/101* (2013.01); *F04B 7/02* (2013.01); *F04C 15/064* (2013.01); *F16K 15/025* (2013.01); *F16K 15/03* (2013.01); *F16K 15/04* (2013.01); *F16K 15/044* (2013.01); *F16K 17/06* (2013.01); *Y10T 137/7837* (2015.04); *Y10T 137/7878* (2015.04); *Y10T 137/7906* (2015.04)

(58) Field of Classification Search
CPC ...... F16K 1/523; F16K 17/06; F04B 53/1002; F04B 1/0452; F04B 49/22; F04B 7/02; F04B 53/101; F04B 53/1085; F04B 49/225; Y10T 137/7838; Y10T 137/7839; Y10T 137/7841; Y10T 137/7845; Y10T 137/7846; Y10T 137/88054; Y10T 137/7906; Y10T 137/7837; Y10T 137/7878

See application file for complete search history.

(56) References Cited

U.S. PATENT DOCUMENTS

| | | | |
|---|---|---|---|
| 2,081,462 A | 5/1937 | McClure | |
| 2,190,109 A * | 2/1940 | Tinker | F04F 5/46 417/54 |
| 2,470,372 A * | 5/1949 | Roth | F16K 17/0406 137/539.5 |
| 2,941,475 A | 6/1960 | Blair | |
| 3,253,612 A * | 5/1966 | Curatola | F16K 1/523 137/553 |
| 3,450,385 A * | 6/1969 | Paptzun | F16K 1/36 251/334 |
| 3,715,174 A * | 2/1973 | Davis | B05B 9/0409 417/311 |
| 3,747,635 A | 9/1973 | Garamy | |
| 4,043,710 A * | 8/1977 | Bunn | F04B 39/1013 417/440 |
| 4,112,959 A | 9/1978 | Jaekel | |
| 4,448,212 A | 5/1984 | Rubey | |
| 4,667,696 A * | 5/1987 | van Rensburg | F16K 15/04 137/533.15 |
| 4,684,334 A * | 8/1987 | Gargas | B05B 9/0413 137/512.3 |
| 4,895,499 A | 1/1990 | Gargas | |
| 4,945,941 A * | 8/1990 | Kocher | F16K 15/18 137/315.33 |
| 7,249,748 B2 * | 7/2007 | Bartell, Jr. | F16K 15/063 251/129.03 |
| 2011/0037009 A1 * | 2/2011 | Svensson | F16K 15/044 251/324 |

FOREIGN PATENT DOCUMENTS

| | | | |
|---|---|---|---|
| GB | 312860 A * | 6/1929 | ............ F16K 15/02 |
| GB | 1392944 A | 5/1975 | |

OTHER PUBLICATIONS

European Search Report for EP Application No. 12858233.5, dated Oct. 26, 2015, 6 pages.
Office Action for Chinese Patent Application No. 201280064895, dated Mar. 23, 2016, 13 pages.
Office Action Taiwan Patent Application No. 101147718, dated May 12, 2016, 9 pages.
Australian Patent Examination No. 1 for Australian Patent Application No. 2012352014, dated Aug. 3, 2016, 2 pages.
Office Action for Chinese Patent Application No. 2012800698915, dated Aug. 8, 2016, 9 pages.

* cited by examiner

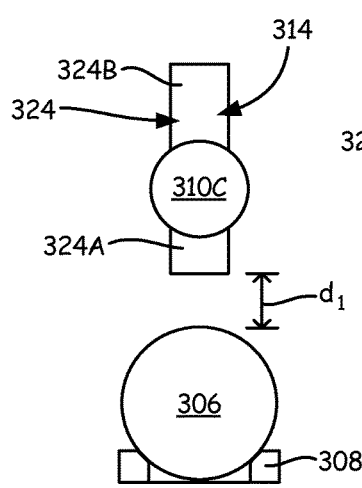 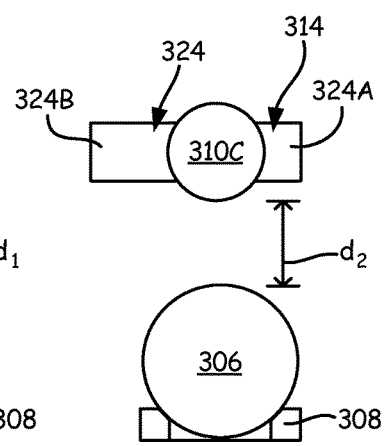 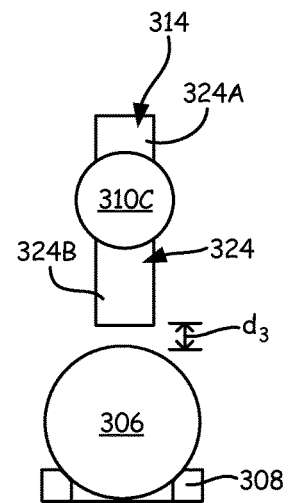
Fig. 8A　　　Fig. 8B　　　Fig. 8C
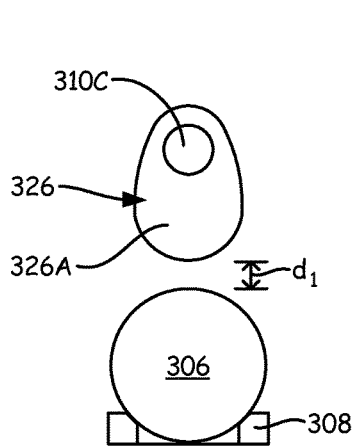 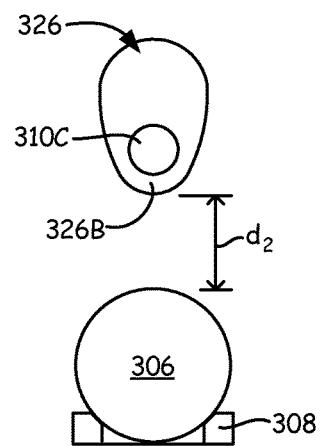 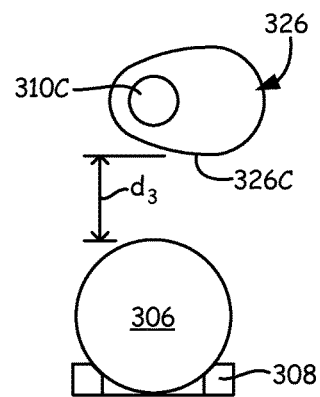
Fig. 9A　　　Fig. 9B　　　Fig. 9C

ADJUSTABLE STOP FOR CHECK VALVE

CROSS-REFERENCE TO RELATED APPLICATION(S)

This application claims priority as a divisional application under 35 U.S.C. § 121 of earlier filed U.S. Non-Provisional application Ser. No. 14/370,177 filed on Jul. 1, 2014, and entitled "ADJUSTABLE STOP FOR CHECK VALVE," which claimed priority as a national stage application under 35 U.S.C. § 371 to earlier filed PCT Application No. PCT/US2012/069780 filed on Dec. 14, 2012, and entitled "ADJUSTABLE STOP FOR CHECK VALVE," which claimed priority to earlier filed U.S. Provisional Application No. 61/570,901 filed on Dec. 15, 2011, and entitled "ADJUSTABLE PRESSURE CONTROL USING VARIABLE INLET BALL TRAVEL."

BACKGROUND

The present disclosure relates generally to valves for fluid pumping systems. More particularly, the present disclosure relates to adjustable stops for check valves.

Fluid pumping systems are typically used to pressurize materials that are applied using various spray systems. A single spray system can be used to dispense a variety of fluids, such as paints, varnishes, textured coatings, solvents, epoxies, polyurethane and the like. Each of these fluids has a different viscosity, which affects the quality of the sprayed fluid and the efficiency of the pumping system. It is, therefore, desirable to adjust settings of the spray system to accommodate the viscosities of different fluids. One such setting is the opening size at the low pressure inlet of the pump, which is typically determined by an inlet check valve. Thick fluids require large inlet openings to permit a sufficient volume of fluid through the inlet. Inlet openings that are too small for a thick fluid can cause undesirable suction to form in the pump if the fluid cannot enter the inlet fast enough. Thin fluids only require small inlet openings to properly prime the pump and to run efficiently. Too much travel of the ball may cause wear of the ball and ball seat due to excess inertia of the ball, and may reduce pump efficiency. In conventional spray systems, adjustment of the inlet opening requires disassembly of the spray system. For example, U.S. Pat. No. 7,025,087 to Weinberger et al. discloses an inlet ball valve having shims that change the inlet opening size. In order to add or remove shims, however, the pump must be disassembled, which is inconvenient and inefficient. There is, therefore, a need for a more expedient inlet opening adjustment mechanism.

SUMMARY

The present disclosure is directed to a check valve for a pump. The check valve comprises a housing, a fluid passage, a seat, a valve member and a stop. The fluid passage extends through the housing from a first end to a second end. The seat is disposed in the fluid passage between the first and second ends. The valve member is positioned in the passage to engage the seat. The stop extends through the housing to engage the valve member. The stop is accessible from outside the housing to adjust a distance the valve member can travel from the seat. In one embodiment, the stop includes a variable stop feature, such as an offset pin or a cam. In another embodiment, the stop includes a pump control valve. In yet another embodiment, the housing includes markings to indicate a position of the stop. The valve member comprises a ball or a poppet in different embodiments.

BRIEF DESCRIPTION OF THE DRAWINGS

FIGS. 8A-8C show a first embodiment of the rotatable ball stop of FIG. 7 comprising an offset pin.

FIGS. 9A-9C show a second embodiment of the rotatable ball stop of FIG. 7 comprising a cam.

DETAILED DESCRIPTION

Figure 1:
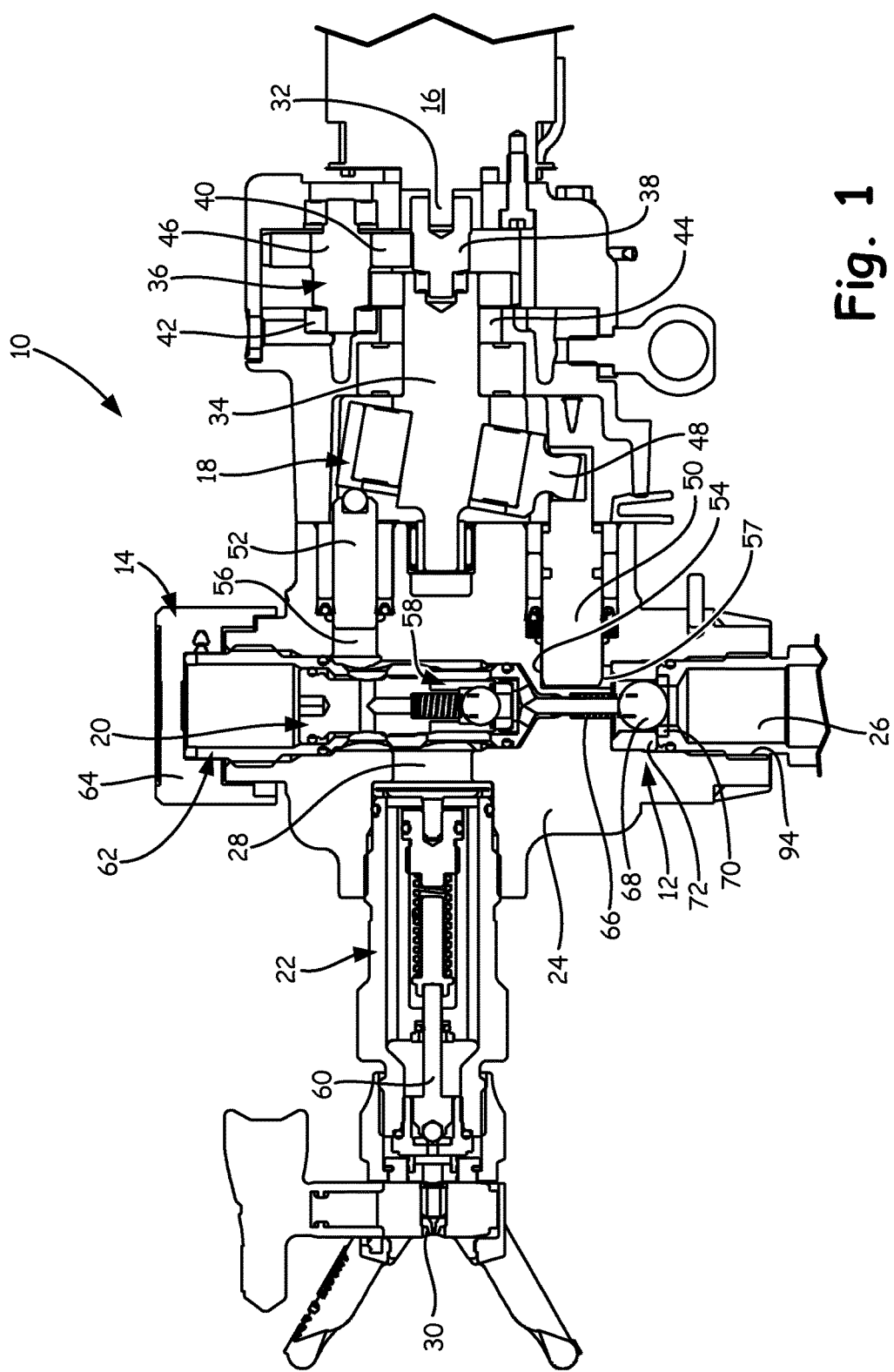
FIG. 1 is a schematic view of a fluid dispensing device having an inlet valve with a first embodiment of an adjustable ball stop.

FIG. 1 is a schematic view of fluid dispensing device 10 having inlet valve 12 with a first embodiment of adjustable stop 14. Fluid dispensing device 10 also includes drive element 16, pumping mechanism 18, pump valve 20 and spray tip assembly 22. Drive element 16 provides power to pumping mechanism 18, which draws fluid into housing 24 at inlet tube 26 from a fluid container (not shown). Pumping mechanism 18 pressurizes the fluid and pumps it to outlet 28, which is fluidly coupled to spray tip assembly 22. Spray tip assembly 22 is user-actuated to permit pressurized fluid through orifice 30, which atomizes the fluid for spraying.

Drive element 16 comprises a mechanism or motor for producing rotation of drive shaft 32. In the embodiment shown, drive element 16 comprises an electric motor. In other embodiments, drive element 16 may comprise a pneumatic motor. Pumping mechanism 18 comprises a dual piston pump. In other embodiments, pumping mechanism 18 may comprise a double-displacement single piston pump, a gerotor (generated rotor), a gear pump or a rotary vane pump. Pumping mechanism 18 includes shaft 34, which is coupled to shaft 32 of drive element 16 through gear system 36. For example, gears 38, 40, 42 and 44, and shaft 46 provide a gear reduction means that slows the input to shaft 34 from the input provided by shaft 32. Specifically, shaft 32 rotates gear 38, which is engaged with gear 40 to rotate shaft 46. Shaft 46 rotates gear 42, which drives shaft 34 through gear 44. Rotation of shaft 34 produces wobble of hub 48. Operation of hub 48 is described further in U.S. Pat. App.

Pub. No. 2012/0037726 to Johnson et al., which is assigned to Graco Minnesota Inc. and is incorporated by this reference.

Pistons 50 and 52 engage hub 48 such that wobble of hub 48 produces reciprocating motion of pistons 50 and 52. Piston 50 is disposed within cylinder 54 and piston 52 is disposed within cylinder 56. On a back stroke, piston 50 retreats within cylinder 54 via coupling to hub 48 to draw fluid from inlet tube 26 into cylinder 54 through port 57, while piston 52 simultaneously is pushed forward via engagement with hub 48 to push fluid from cylinder 56 and chamber 58 into outlet 28. On a forward stroke, piston 50 moves forward via coupling to hub 48 to push fluid from cylinder 54 into chamber 58 and cylinder 56 through porting in housing 24 (not shown), while piston 52 simultaneously is pushed backward via pressure within chamber 58 as fluid travels from chamber 58 into cylinder 56. To accommodate such volumetric flows, piston 50 has a displacement volume sufficient to fill both cylinder 56 and chamber 58. Pump valve 20 prevents fluid within chamber 58 from back flowing into cylinder 54. Inlet valve 12 prevents fluid within cylinder 54 from back flowing into inlet tube 26. Pressurized fluid from outlet 28 flows into spray tip assembly 22, which includes actuation needle 60 that can be selectively actuated to allow pressurized fluid to flow through orifice 30. Operation of spray tip assembly 22 is described further in U.S. Pat. App. Pub. No. 2011/0198413 to Thompson et al., which is assigned to Graco Minnesota Inc. and is incorporated by this reference.

Fluid dispensing device 10 is configured to be able to spray fluids having different viscosities, fluids that are thick and fluids that are thin. For example, device 10 may spray thick fluids such as coatings or epoxies, and device 10 may be configured to spray thin fluids, such as paint and varnishes. Adjustable stop 14 is adjusted in order to configure device 10 for different fluids by changing the amount that inlet check valve 12 is permitted to open. Adjustable stop 14 includes rod 62 and knob 64. Inlet check valve 12 includes spring 66, ball 68, seat 70 and collar 72, which are shown and discussed in greater detail with reference to FIGS. 2 and 3.

Figure 2:
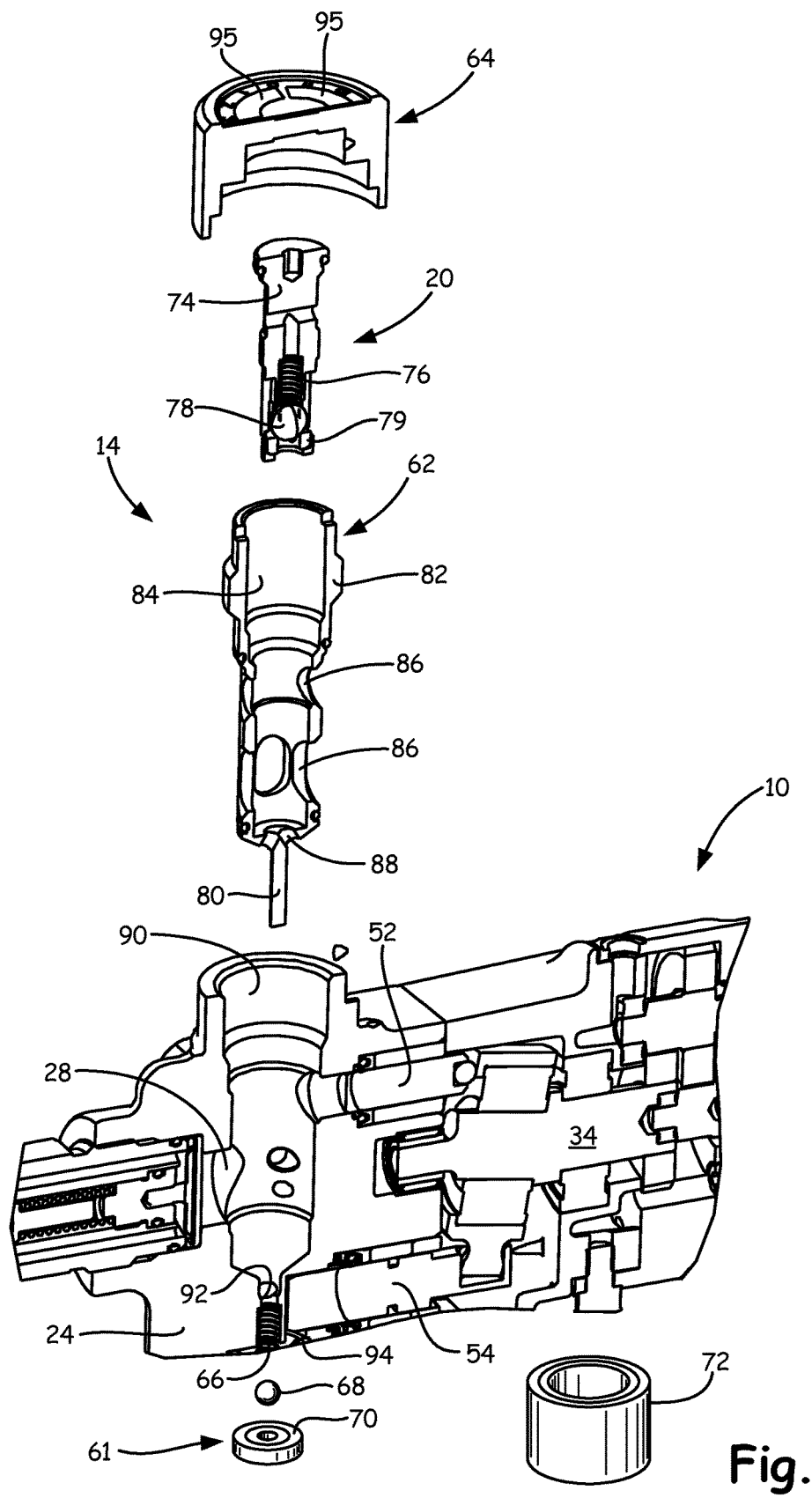
FIG. 2 is an exploded view of the dispenser of FIG. 1 showing the adjustable ball stop, the inlet check valve, a pump valve and a control knob.
Figure 3:
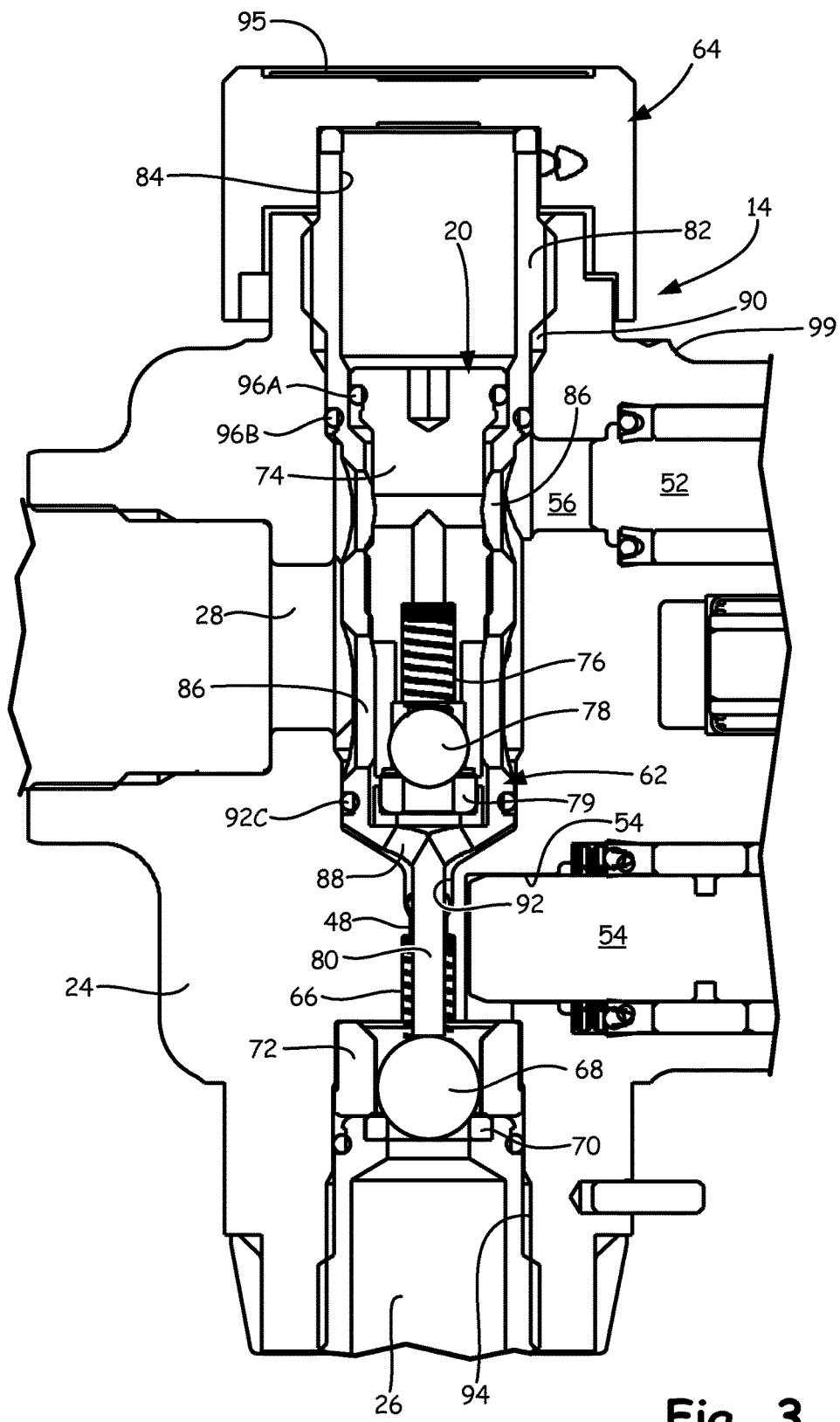
FIG. 3 is a close-up view of the pump valve inserted into a slot of the adjustable ball stop, and the adjustable ball stop and inlet check valve inserted into sockets in the housing.

FIG. 2 is an exploded view of dispenser 10 of FIG. 1 showing adjustable stop 14 and inlet check valve 12. Dispenser 10 includes housing 24 and pump valve 20. Adjustable stop 14 includes adjustment rod 62 and knob 64. Inlet check valve 12 includes spring 66, ball 68, seat 70 and collar 72. Pump valve 20 includes body 74, spring 76, ball 78 and seat 79. Adjustment rod 62 of adjustable stop 14 includes stem 80, tube 82, channel 84, windows 86 and inlets 88. Housing 24 includes socket 90, inlet passage 92, and socket 94, which fluidly connects to inlet tube 26 (FIGS. 1 & 3). When assembled, inlet check valve 12 controls fluid flow from inlet tube 26 to channel 84 through inlet passage 92, while pump valve 20 controls fluid flow from channel 84 to outlet 28 through windows 86. Specifically, knob 64 is rotated to thread adjustment rod 62 in and out of socket 90 to change the distance between stem 80 and seat 70, while pump valve 20 rides along inside channel 84. Knob 64 includes markings 95 that provide an indication of the position of stem 80 relative to seat 70 or that provide an indication of the type, e.g. viscosity, of fluid that system 10 is configured to spray.

FIG. 3 is a close-up view of pump valve 20 inserted into channel 84 of adjustment rod 62, adjustable stop 14 inserted into socket 94 in housing 26, and inlet valve 12 inserted into socket 94 of housing 26. When assembled, body 74 of pump valve 20 is inserted into channel 84 such that spring 76 biases ball 78 against seat 79. In one embodiment, body 74 is threaded into channel 84. As such, fluid is prevented from passing between inlets 88 and windows 86 by ball 78. Adjustment rod 62 is inserted into socket 90 such that stem 80 is inserted into inlet passage 92. In one embodiment, adjustment rod 62 is threaded into socket 90. Inserted as such, windows 86 in tube 82 allow cylinder 54 to fluidly communicate with outlet 28 via channel 84. Seal 96A prevents fluid between tube 82 and body 74 from escaping channel 84, and seals 96B and 96C prevent fluid between housing 24 and tube 82 from escaping socket 90. Stem 80 extends through inlet passage 92 to engage ball 68.

Seat 70 is disposed within a counterbore in inlet tube 26. Inlet tube 26 is inserted into socket 94 such that ball 68 is positioned between seat 70 and stem 80. In one embodiment, inlet tube 26 is threaded into socket 94. Collar 72 is disposed within socket 94 and surrounds ball 68. Spring 66 is disposed within inlet passage 92 and is biased between flange 98 and ball 68. Stem 80 is thus positioned to limit the distance that ball 68 can be displaced from seat 70. In the configuration depicted in FIG. 3, ball 68 is locked down and is not permitted to move. However, knob 64 can be rotated to unthread tube 82 from socket 90, thereby retreating stem 80 from ball 68. Retracting stem 80 within inlet passage 92 allows fluids to pass through seat 70. Retracting stem 80 a small distance suitable for thin fluids limits unnecessary travel of ball 68, thereby reducing wear of ball 68 and seat 70. Retracting stem 80 a further distance away from seat 70 suitable for thick fluids allows the thick fluid to more easily pass through seat 70, thereby mitigating the formation of suction within pumping mechanism 18 (FIG. 1). After passing through seat 70, fluid travels through inlet passage 92, through inlets 88 and into seat 79. Fluid pressure displaces ball 78 such that the fluid continues into body 74, travels through windows 86 and into outlet 28, thus being positioned for dispensing with spray tip assembly 22 (FIG. 1).

In one embodiment, tube 82 and socket 90 are provided with left-hand threads to provide an operator of device 10 with an intuitive interface that simulates "dialing down" to a thinner fluid. Specifically, turning knob 64 counter-clockwise inserts stem 80 further into passage 92 for use with thinner fluids. Markings 95 on knob 64 can provide instruction as to which direction to rotate knob 64 for use with different fluids. Additionally, markings 95 on knob 64 can be aligned with marking 99 on housing 24 to provide an operator a reference point for the position of knob 64. Thus, numbers provided on knob 64 can be aligned with marking 99 to indicate the operative position of stem 80 for use with fluids of different viscosities.

Although FIGS. 1-3 describe an adjustable ball stop with reference to a ball valve, other types of check valves may be used. For example, the present invention may be used with poppet valves or flapper valves. Ball valves, poppet valves and flapper valves each include a movable valve member that engages with the adjustable stop of the present invention to limit movement of the valve member from a valve seat. Likewise, FIGS. 1-3 depict the present invention applied to an inlet check valve, but the invention is also readily applicable to outlet check valves. Although FIGS. 1-3 depict one embodiment of adjusting ball travel in a pump inlet check valve, other embodiments of adjustable stop 14 are contemplated in the present invention, as are described with reference to FIGS. 4-12.

Figure 4:
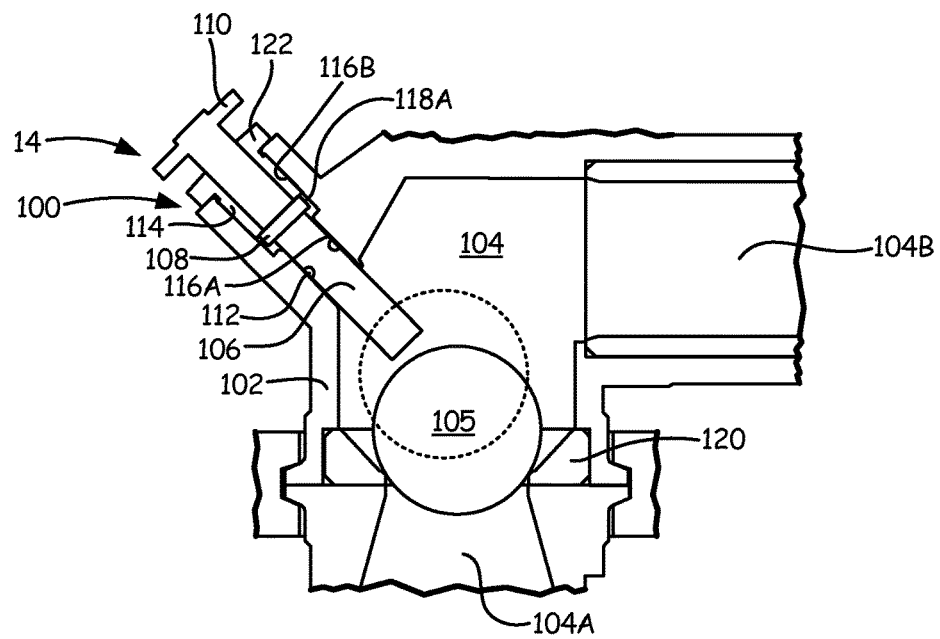
FIG. 4 is a cross-sectional view of a second embodiment of an adjustable ball stop comprising a detent set-point rod.
Figure 5:
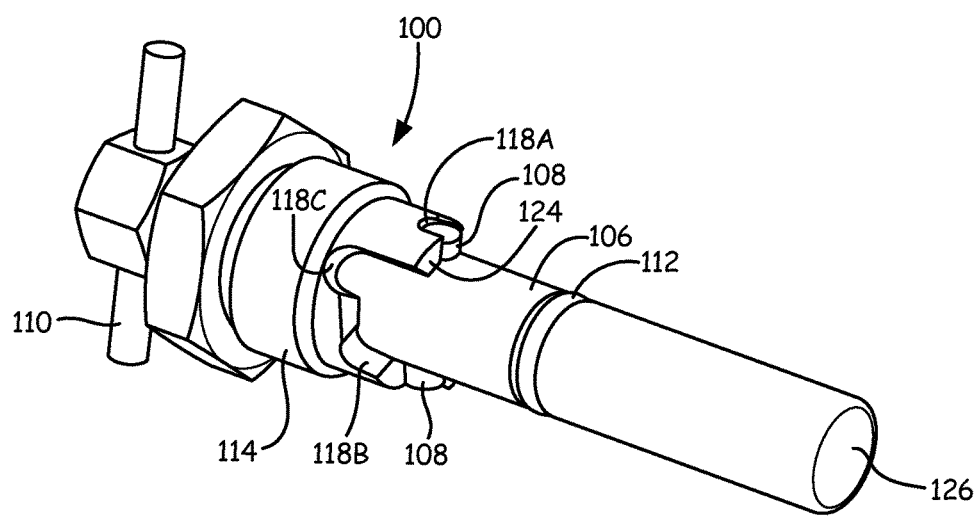
FIG. 5 is a perspective view of the adjustable ball stop of FIG. 4 showing the detent set-point rod inserted into a ball valve housing.

FIG. 4 is a cross-sectional view of a second embodiment of adjustable stop 14 comprising detent set-point rod 100. Detent set-point rod 100 is coupled to housing 102, which defines fluid flow path 104. Fluid flow path 104 extends from inlet 104A to outlet 104B, and detent set-point rod 100 is disposed between inlet 104A and outlet 104B to engage ball 105. Detent set-point rod 100 includes rod 106, detent bar 108, handle bar 110 and seal 112. Rod 106 is inserted into cartridge 114, which is threaded into counterbore 116B of bore 116A in housing 102. FIG. 5 is a perspective view of detent set-point rod 100 of FIG. 4 showing rod 106 inserted into cartridge 114. Cartridge 114 includes slots 118A, 118B and 118C, which are configured to engage detent bar 108 to limit a distance rod 106 can be displaced from seat 120 (FIG. 4).

As shown in FIG. 4, cartridge 114 is positioned around rod 106, such as with a force fit. Thus, the position of rod 106 with respect to cartridge 114 remains fixed unless rod 106 is rotated, such as by using handle bar 110. Cartridge 114 is coupled to housing 102 via a threaded engagement such that the position of cartridge 114 is fixed with respect to housing 102. For example, cartridge 114 can be threaded into counterbore 116B until flange 122 engages housing 102. Detent bar 108 is inserted through a cross-bore in rod 106 such as with an interference fit connection. Rod 106 is positioned within bore 116A such that detent bar 108 is positioned within counterbore 116B between bore 116A and cartridge 114. Rod 106 is freely rotatable within bore 116A. Seal 112 prevents fluid within fluid flow path 104 from escaping housing 102.

With reference to FIG. 5, slots 118A-118C have differing depths with respect to end surface 124 of cartridge 114. Slot 118A is the shallowest such that the distance between end 126 of rod 106 and end surface 124 is the greatest. Slot 118B is deeper than slot 118A, and slot 118C is deeper than slot 118B such that the distance between end 126 and end surface 124 diminishes as detent bar 108 is moved from slot 118A, to slot 118B to slot 118C. Detent bar 108 is moved between slots 118A, 118B and 118C manually by pushing rod 106 further into cartridge 114, rotating rod 106 to the desired position, and then pulling rod 106 further out of cartridge 114 to engage with one of slots 118A, 118B and 118C in a retracted position. A spring (not shown) may be used to bias rod 106 in the retracted position, such as a spring positioned between flange 122 and handle bar 110.

With reference to FIG. 4, as the position of rod 106 is adjusted using detent bar 108 and slots 118A-118C, end 126 of rod 106 is moved with respect to seat 120, thereby changing the distance that ball 105 can be displaced from seat 120. In FIG. 4, ball 105 is shown in a solid line engaged with seat 120, and in dashed lines engaged with rod 106. When detent bar 108 is inserted into slot 118A, as shown, the distance between end 126 and seat 120 is the least. Thus, very thin fluids will be able to pass between seat 120 and ball 105. If detent bar 108 is moved into slots 118B or 118C, thicker fluids will be able to more easily pass between seat 120 and ball 105. Cartridge 114 can be provided with markings on flange 122 to indicate the position of slots 118A-118C. Handle bar 110 can be positioned relative to rod 106 in the same orientation as detent bar 108. As such, handle bar 110 can be aligned with markings on flange 122 to facilitate insertion of detent bar 108 into slots 118A-118C.

Figure 6:
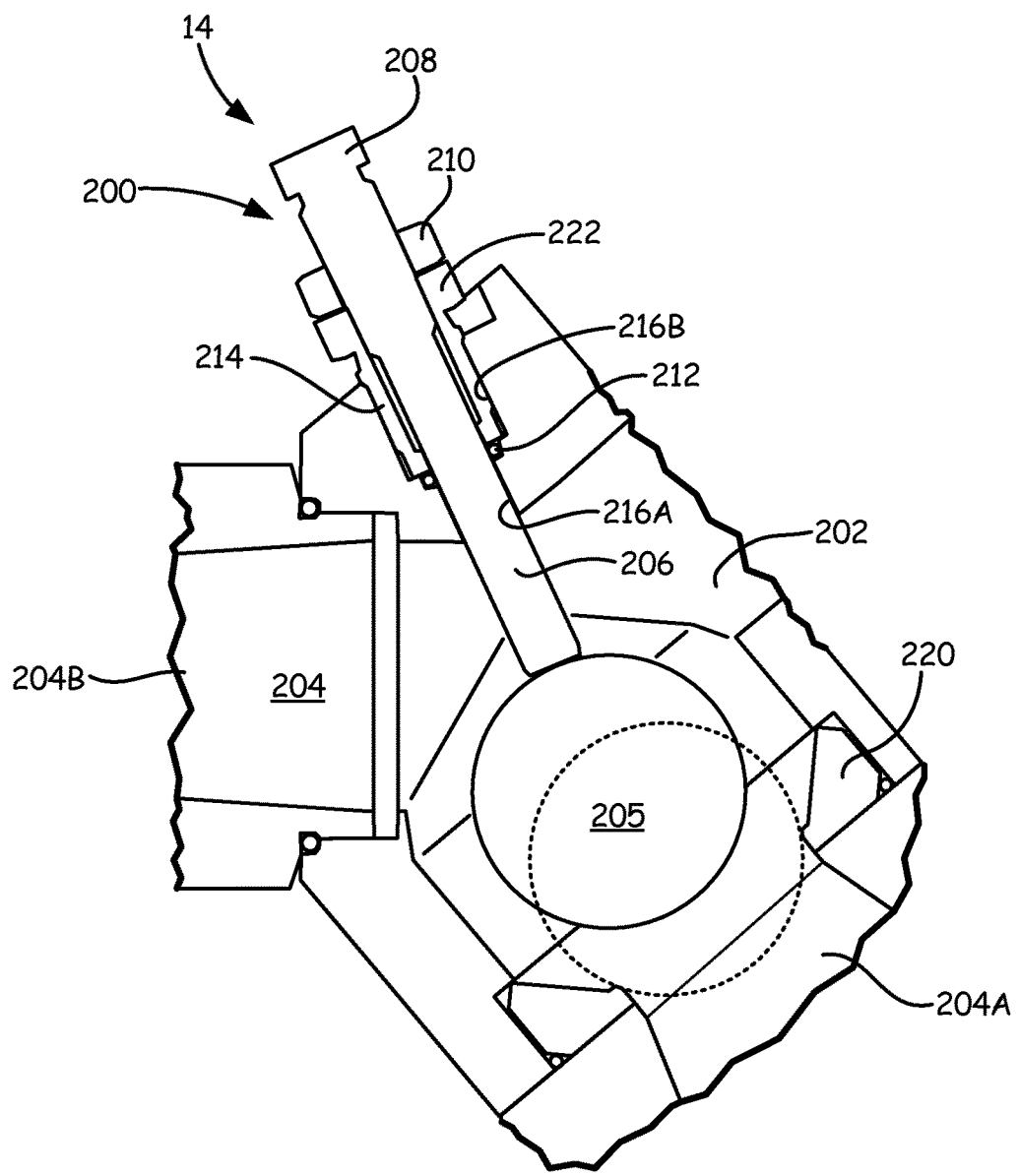
FIG. 6 is a cross-sectional view of a third embodiment of an adjustable ball stop comprising a threaded set-point rod.

FIG. 6 is a cross-sectional view of a third embodiment of adjustable stop 14 comprising threaded set-point rod 200. Threaded set-point rod 200 is coupled to housing 202, which defines fluid flow path 204. Fluid flow path 204 extends from inlet 204A to outlet 204B, and threaded set-point rod 200 is disposed between inlet 204A and outlet 204B to engage ball 205. Threaded set-point rod 200 includes rod 206, hex head 208, lock nut 210 and seal 212. Cartridge 214 is coupled to housing 202 and engages with rod 206 to limit the distance ball 205 can be displaced from seat 220. Specifically, cartridge 214 is threaded into counterbore 216B, while rod 206 is threaded into cartridge 214 to extend through bore 216A. Seal 212 prevents fluid within fluid flow path 204 from escaping housing 202. Using hex head 208, the position of rod 206 relative to cartridge 214 can be adjusted at the threaded engagement to change a distance between end 226 of rod 206 and seat 220. In FIG. 6, ball 205 is shown in a solid line engaged with rod 206, and in dashed lines engaged with seat 220. Thus, adjustable stop 14 can be configured to permit fluids of different viscosities to more optimally pass between seat 220 and ball 205. The threaded engagement between rod 206 and cartridge 214 allows for an infinite adjustment of the travel of ball 205 between a maximum and a minimum distance, produced by the extremes of the threaded engagement. Once rod 206 is adjusted to the desired position, lock nut 210 can be threaded down on rod 206 to engage flange 222 and lock the position of rod 206 relative to cartridge 214.

Figure 7:
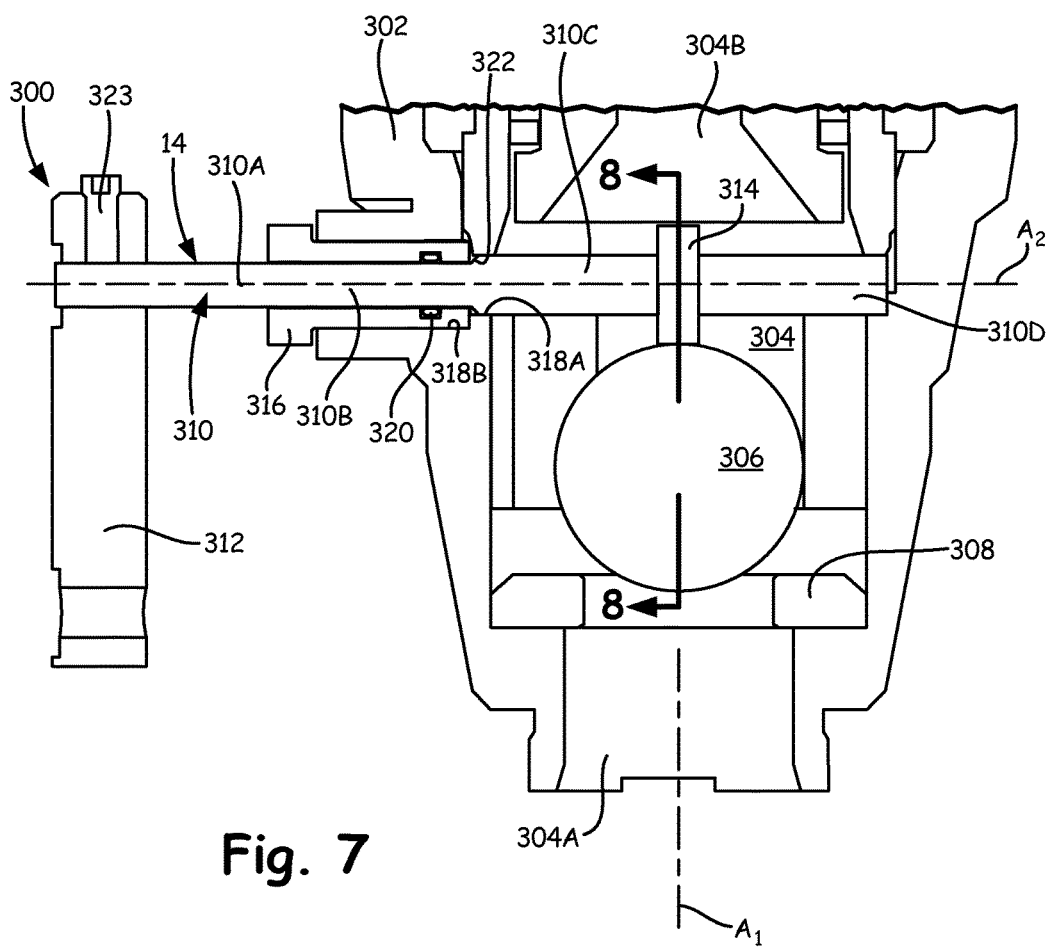
FIG. 7 is a cross-sectional view of a fourth embodiment of an adjustable ball stop comprising a rotatable ball stop.

FIG. 7 is a cross-sectional view of a fourth embodiment of adjustable stop 14 having rotatable ball stop 300. Rotatable ball stop 300 is coupled to housing 302, which defines fluid flow path 304. Fluid flow path 304 extends from inlet 304A to outlet 304B, and rotatable ball stop 300 is disposed between inlet 304A and outlet 304B to engage ball 306. Ball 306 engages seat 308. Rotatable ball stop 300 includes rod 310, handle 312 and variable stop 314. Rod 310 is joined to housing 302 using cartridge 316, which is threaded into counterbore 318B of bore 318A. Seal 320 is positioned within cartridge 316 around rod 310 to prevent fluid from within flow path 304 from leaving housing 302.

Rod 310 extends through cartridge 316 in a rotatable fashion. In one embodiment, rod 310 is threaded into cartridge 316. In other embodiments, rod 310 may be freely rotatable within cartridge 316 and retained by step 322 on rod 310 that engages a corresponding lip formed by cartridge 316 at bore 318A. Rod 310 includes first portion 310A, second portion 310B, third portion 310C and fourth portion 310D. First portion 310A extends from an exterior of housing 302 to provide for adjustment of variable stop 314 external of housing 302 via handle 312. Second portion 310B is coupled to housing 302, such as through a direct threaded engagement or through threaded engagement with cartridge 316. Third portion 310C extends into flow path 304 so as to position variable stop 314 relative to ball 306. Fourth portion 310D extends into housing 302 to support rod 310. Fourth portion 310D may be simply supported in an un-threaded bore. In other embodiments, fourth portion 310D may be omitted such that third portion 310C is cantilevered from housing 302. Handle 312 may be releasably attached to rod 310, such as by using set screw 323, to facilitate assembly of rod 310 to housing 302 and cartridge 316.

Ball 306 is positioned in flow path 304 to interrupt flow of fluid between inlet 304A and 304B. In the depicted embodiment, flow path 304 extends linearly along axis $A_1$ between inlet 304A and outlet 304B. Thus, seat 308 includes an opening for ball 308 that is concentric with axis $A_1$. A spring (not shown) may be used to bias ball 306 against seat 308. A pressure differential between inlet 304A and outlet 304B causes ball 306 to disengage seat 308, thereby permitting fluid flow. The distance that ball 306 is permitted to move away from seat 308 is determined by variable stop 314. In the embodiment shown, rod 310 extends across flow path 304 along axis $A_2$ that is generally perpendicular to axis $A_1$ of flow path 304. Variable stop 314 extends from third portion 310C to engage ball 306. Variable stop 314 includes one or more features that extend radially from rod 310 and axis $A_2$ to change a distance between variable stop 314 and seat 308 along axis $A_1$, thereby changing the distance ball 306 can move away from seat 308. For example, variable stop 314 may provide a plurality of discrete positions for ball 306, or may provide an unlimited number of positions for ball 306.

FIGS. 8A-8C show a first embodiment of rotatable ball stop 300 of FIG. 7 wherein variable stop 314 comprises offset pin 324. Ball 306 sits against seat 308 in a closed position. Third portion 310C of rod 310 is fixed relative to seat 308 via coupling to housing 302 (FIG. 7). Offset pin 324 extends through third portion 310C, which extends along axis $A_2$ (FIG. 7), such that first portion 324A extends a first radial distance from rod 310 and second portion 324B extends a second radial distance from rod 310 that is greater than the first distance. In FIG. 8A third portion 310C is rotated such that first end 324A of pin 324 faces towards ball 306. First end 324A extends from rod 310 such that distance $d_1$ is provided to ball 306. Thus, ball 306 can only be displaced distance $d_1$ from seat 308 to permit fluid through seat 308. If thicker fluids are needed to be passed through seat 308, third portion 310C can be rotated such that pin 324 is perpendicular to axis $A_1$ (FIG. 7) extending through seat 308. Ball 306 is thus permitted its maximum travel distance $d_2$ between seat 308 and rod 310. If thinner fluids are needed to be passed through seat 308, third portion 310C can be rotated such that second end 324B of pin 324 faces towards ball 306. Second end 324B extends from rod 310 such that distance $d_3$ is provided to ball 306. Thus, ball 306 can only be displaced distance $d_3$ from seat 308 to permit fluid through seat 308. The embodiment of FIGS. 8A-8C provide three distinct ball travel distances for thick, thin and intermediate fluids, as are determined by different radial dimensions of offset pin 324 relative to axis $A_2$ within rod 310. Variable stop 314 may have other shapes that permit additional levels of ball travel distances.

FIGS. 9A-9C show a second embodiment of rotatable ball stop 300 of FIG. 7 wherein variable stop 314 comprises cam 326. Ball 306 sits against seat 308 in a closed position. Third portion 310C of rod 310 is fixed relative to seat 308 via coupling to housing 302 (FIG. 7). Cam 326 surrounds third portion 310C, which extends along axis $A_2$ (FIG. 7), such that lobe 326A extends a first radial distance from rod 310 and bore portion 326B extends a second radial distance from rod 310 that is less than the first radial distance. In FIG. 9A third portion 310C is rotated such that lobe 326A of cam 326 faces towards ball 306. Lobe 326A extends from rod 310 such that distance $d_1$ is provided to ball 306. Thus, ball 306 can only be displaced distance $d_1$ from seat 308 to permit very thin fluid through seat 308. If thicker fluids are needed to be passed through seat 308, third portion 310C can be rotated one-hundred-eighty degrees such that bore portion 326B faces towards ball 306. Ball 306 is thus permitted its maximum travel distance $d_2$ between seat 308 and rod 310. The embodiment of FIGS. 9A and 98B provide two extreme ball travel distances for thin and thick fluids, respectively. If fluids of intermediate viscosity are needed to be passed through seat 308, third portion 310C can be rotated to rotate cam 326 through an infinite number of intermediate positions for fluids having different levels of viscosity. In FIG. 3C, cam 326 is positioned such that lobe 326A and bore portion 326B extend perpendicularly to axis $A_1$ (FIG. 7) extending through seat 308. As such, curved side 326C of cam 326 faces towards ball 306. Curved side 326C has a thickness greater than bore portion 326B, but smaller than lobe 326A. Thus, ball 306 can only be displaced distance $d_3$ from seat 308 to permit fluid through seat 308. Curved side 326C has a shape that is arcuate so as to engage ball 306 at different circumferential positions along the surface of ball 306 while ball 306 is at different axial positions along axis $A_1$, thereby providing a range of ball travel distances. The different axial positions of ball 306 along axis $A_1$ are determined by cam 326 having different radial dimensions relative to axis $A_2$ along which rod 310 extends.

Figure 10:
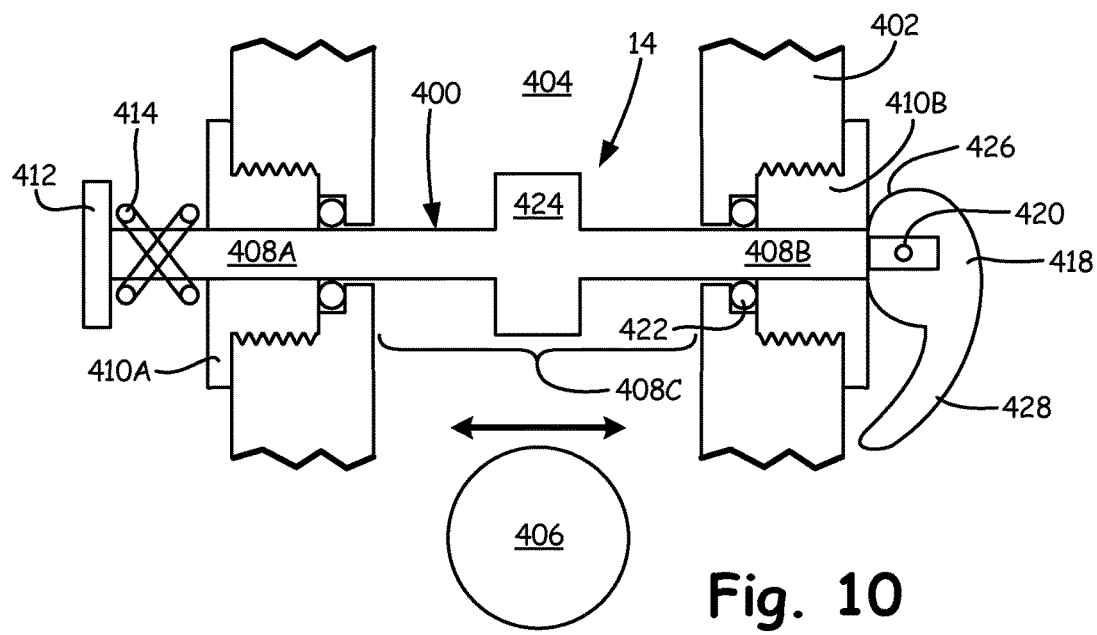
FIG. 10 is a cross-sectional view of a fifth embodiment of an adjustable ball stop comprising a push-pull bar.

FIG. 10 is a cross-sectional view of a fifth embodiment of adjustable stop 14 comprising push-pull bar 400. Push-pull bar 400 is coupled to housing 402, which defines fluid flow path 404. Push-pull bar 400 extends across fluid flow path 404 to engage a ball 406 disposed in fluid flow path 404. Push-pull bar 400 includes first end 408A, second end 408B and middle section 408C. First end 408A is inserted into cartridge 410A and includes flange 412 to retain spring 414. Cartridge 410A is threaded into housing 402 and seal 416 prevents fluid from within fluid flow path 404 from leaking out of housing 402. Second end 408B is inserted into cartridge 410B and is rotatably coupled to locking cam 418 at pin 420. Cartridge 410B is threaded into housing 402 and seal 422 prevents fluid from within fluid flow path 404 from leaking out of housing 402. Middle section 408C includes step 424, which is positioned opposite ball 406.

Spring 414 biases push-pull rod 400 toward the left with reference to the orientation of FIG. 10. Cam 418 includes arcuate surface 426 that engages housing 402 and that extends along arc that varies in distance from pin 420. Cam 418 can be rotated at pin 420 using handle 428 pull push-pull rod 400 toward the right with reference to the orientation of FIG. 10. With cam 418 rotated so that handle 428 is down (with reference to the orientation of FIG. 10), step 424 is positioned in-line with ball 406 with reference to fluid flow path 404. Thus, ball 406 can only move upward (with reference to the orientation of FIG. 10) until it engages step 424. Can 418 can be rotated so that handle 428 is upward (with reference to the orientation of FIG. 10) to pull rod 400 and step 424 away from alignment with ball 406 so that ball 406 can move upward an additional distance equal to the thickness of step 424. Thus, the travel of ball 406 can be adjusted to improve performance of a pump for fluids of different viscosities. In other embodiments, middle section 408C can include multiple steps of different thicknesses to provide a plurality of discrete ball travel increments. In other embodiments, middle section 408C can be tapered, such as over a conical section, to provide a plurality of intermittent levels of ball travel between two extreme levels.

Figure 11:
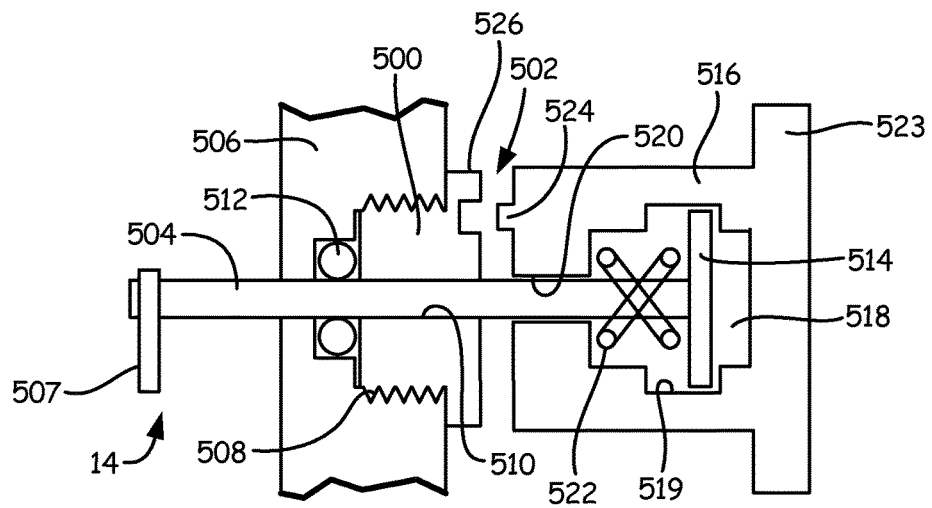
FIG. 11 is a cross-sectional view of a sixth embodiment of an adjustable ball stop having a cartridge with a detent position control.

FIG. 11 is a cross-sectional view of a sixth embodiment of adjustable stop 14 having cartridge 500 with detent position control 502. In the embodiment of FIG. 11, adjustable stop 14 comprises a rotatable shaft similar to that of FIG. 7. Specifically, rod 504 extends into housing 506 to position variable stop feature 507 relative to a valve ball (not shown) to adjust ball travel. Variable stop feature 507 comprises a pin or cam, such as is described with reference to FIGS. 8A-9C. Rod 504 is secured to housing 506 via cartridge 500, which is threaded into bore 508. Rod 504 extends through bore 510 in cartridge 500. Seal 512 prevents fluid from within housing 506 escaping through bores 508 and 510. Rod 504 also includes flange 514, which is disposed within knob 516. Knob 516 includes cavity 518, slot 519 that surrounds flange 514, bore 520 through which rod 504 extends, spring 522 that biases knob 516 toward cartridge 500, and grip flange 523. Detent position control 502 includes detent 524 and detent hole 526.

Figure 12:
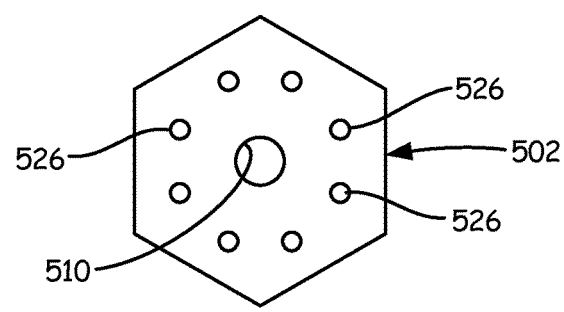
FIG. 12 is a top view of the cartridge of FIG. 11 showing different detent holes.

Detent 524 is sized to fit into detent hole 526 to limit rotation of knob 516 relative to cartridge 500. FIG. 12 is a top view of cartridge 500 of FIG. 11 showing different detent holes 526. As shown in FIG. 12, detent holes 526 are distributed in a circular array centered on bore 510 in a surface of cartridge 500 that faces towards knob 516 and detent 524. As mentioned, spring 522 pushes knob 516 toward cartridge 500 by pushing against cavity 518 and flange 514 so that detent 524 is pushed into one of holes 526. As such, variable stop feature 507 is locked into one rotational position on rod 504 relative to a ball seat of a ball for which variable stop feature 507 is configured to limit movement. The rotational position of variable stop feature 507 can be adjusted by pulling on grip flange 523 to retract knob 516 away from cartridge 500, rotating knob 516 on rod 504 so that detent 524 aligns with another of holes 526 in the circular array, and releasing grip flange 523 so that detent 524 seats within one of holes 526. As discussed with reference to FIGS. 8A-9C, a variable stop feature can be repositioned to change the inlet opening size of a valve to optimize entry of fluids with different viscosities into a pump. Detent position control 502 allows the variable stop feature to be held in place such that the inlet opening size does not drift or change during operation of the pumping system. In another embodiment of the invention, detent holes 526 can be provided with markings that indicate the position of variable stop feature 507 relative to a ball seat, or that indicate a desired position of knob 516 for fluids of different viscosities.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims. For example, various components of system 10 and melt system 30 can be sized, shaped, and configured differently than as illustrated as appropriate for a given application.

The invention claimed is:

1. A check valve comprising:
a housing including a threaded coupling;
a fluid passage extending through the housing;
a seat disposed in the fluid passage;
a valve member positioned in the passage to engage the seat;
a cartridge threaded into the threaded coupling; and
a stop extending through the housing to engage the valve member, the stop comprising:
a rod joined to the housing at the threaded coupling and having a first end terminating outside of the housing and a second end terminating in the fluid passage;
wherein the second end of the rod defines a gap and thus a distance the valve member can travel from the seat;
wherein the stop is accessible from outside the housing to adjust the gap between the rod and the valve member, to thereby adjust the distance the valve member can travel from the seat;
wherein the rod is threaded into the cartridge, extends through a bore in the cartridge, and a lock limits rotation of the rod relative to the cartridge;
wherein a gap is present within the cartridge between an outer surface of the rod and an inner surface of the cartridge; and
wherein a seal is positioned between the rod and the housing, and wherein the seal abuts and is adjacent an end face of the cartridge positioned within the housing, and wherein the seal abuts the housing.

2. The check valve of claim 1 wherein:
the rod extends obliquely to an axis extending through the seat; and
the second end of the rod is configured to directly engage the valve member when the valve member travels from the seat.

3. The check valve of claim 1 wherein the lock is a lock nut.

4. The check valve of claim 1, wherein the rod includes external threads that are threaded into mating internal threads of the cartridge, and wherein the threaded engagement between the rod and the cartridge allows for an infinite adjustment of the travel of the valve member between a maximum and a minimum distance, produced by extremes of the threaded engagement.

5. The check valve of claim 1, wherein the seal is configured to prevent fluid within the fluid passage from escaping the housing.

6. The check valve of claim 1, wherein the first end of the rod includes a hex head, and wherein rotation of the hex head adjusts the gap between the rod and the valve member.

7. The check valve of claim 1, wherein the check valve is configured to be installed in a fluid pump.

8. A pump comprising:
a housing including a threaded coupling;
a fluid passage extending through the housing from an inlet to an outlet;
a pump mechanism disposed within the housing and configured to pump fluid from the inlet to the outlet;
a cartridge located within the housing;
a check valve disposed in the fluid passage, the check valve comprising:
a seat disposed in the fluid passage;
a ball valve separable from the seat over a gap; and
a rod coupled at the threaded coupling to the housing such that the rod extends obliquely to an axis extending through the seat, the rod comprising:
a first section extending from an exterior of the housing; and
a second section terminating in the fluid passage, wherein the second section is configured to directly engage the ball valve and also configured to define the gap and thus the distance the ball valve can travel from the seat;
wherein the rod extends through a bore in the cartridge and a lock is configured to limit rotation of the rod relative to the cartridge.

9. The pump of claim 8, wherein:
the lock is a lock nut.

10. The pump of claim 9, wherein the lock nut engages a flange of the cartridge to lock the position of the rod relative to the cartridge.

11. The pump of claim 8, wherein the rod includes external threads that are threaded into mating internal threads of the of the cartridge, and wherein the threaded engagement between the rod and the cartridge allows for an infinite adjustment of the travel of the ball valve between a maximum and a minimum distance, produced by extremes of the threaded engagement.

12. The pump of claim 8, wherein a seal is positioned between the rod and the housing and adjacent an end of the cartridge positioned within the housing, and wherein the seal is configured to prevent fluid within the fluid passage from escaping the housing.

13. The pump of claim 8, wherein the first section of the rod includes a hex head, and wherein rotation of the hex head adjusts the gap between the second section of the rod and the ball valve.

14. A check valve comprising:
a housing including a threaded coupling;
a fluid passage extending through the housing;
a seat disposed in the fluid passage;
a valve member positioned in the passage to engage the seat;
a cartridge threaded into the threaded coupling; and
a stop extending through the housing to engage the valve member, the stop comprising:
 a rod joined to the housing at the threaded coupling and having a first end terminating outside of the housing and a second end terminating in the fluid passage;
 wherein the first end of the rod includes a hex head;
 wherein the second end of the rod defines a gap and thus a distance the valve member can travel from the seat;
 wherein rotation of the hex head adjusts the gap between the second end of the rod and the valve member, to thereby adjust the distance the valve member can travel from the seat; and
 wherein a seal:
  is positioned between the rod and the housing;
  abuts and is adjacent an end face of the cartridge positioned within the housing;
  abuts the housing;
  has a maximum outer diameter smaller than an outer diameter of the end face of the cartridge; and
  is configured to prevent fluid within the fluid passage from escaping the housing.

15. The check valve of claim 14, wherein the rod includes external threads that are threaded into mating internal threads of the cartridge, and wherein the threaded engagement between the rod and the cartridge allows for an infinite adjustment of the travel of the valve member between a maximum and a minimum distance, produced by extremes of the threaded engagement.

16. The check valve of claim 14, wherein:
the rod extends obliquely to an axis extending through the seat; and
the second end of the rod is configured to directly engage the valve member when the valve member travels from the seat.

17. The check valve of claim 14, wherein the rod extends through a bore in the cartridge and a lock is configured to limit rotation of the rod relative to the cartridge.

18. The check valve of claim 17, wherein the lock is a lock nut; and wherein the lock nut engages a flange of the cartridge to lock the position of the rod relative to the cartridge.

19. The check valve of claim 14, wherein the check valve is configured to be installed in a fluid pump.

* * * * *